United States Patent [19]
Pendse et al.

[11] Patent Number: 5,734,828
[45] Date of Patent: Mar. 31, 1998

[54] SYSTEM FOR ACCESSING/DELIVERING ON-LINE/INFORMATION SERVICES VIA INDIVIDUALIZED ENVIRONMENTS USING STREAMLINED APPLICATION SHARING HOST AND CLIENT SERVICES

[75] Inventors: Ajit Pendse, Portland; Patrick Gelsinger, Beaverton, both of Oreg.

[73] Assignee: Intel Corporation, Santa Clara, Calif.

[21] Appl. No.: 520,897

[22] Filed: Aug. 30, 1995

[51] Int. Cl.$^6$ .............................. G06F 11/34; G06F 7/04
[52] U.S. Cl. .............................. 395/200.33; 395/200.47; 395/200.48; 395/200.49
[58] Field of Search .................. 395/200.47, 200.01, 395/200.48, 182.09, 200.49, 311, 200.02, 200.33, 200.12; 379/265, 258

[56] References Cited

U.S. PATENT DOCUMENTS

| | | | |
|---|---|---|---|
| 4,533,996 | 8/1985 | Hartung et al. | 364/200 |
| 4,672,662 | 6/1987 | Nishino et al. | 379/277 |
| 4,776,005 | 10/1988 | Patriccione et al. | 379/142 |
| 5,457,797 | 10/1995 | Butterworth et al. | 395/650 |
| 5,459,780 | 10/1995 | Sand | 379/265 |
| 5,493,692 | 2/1996 | Theimer et al. | 455/26.1 |
| 5,533,103 | 7/1996 | Peavey et al. | 379/69 |
| 5,539,744 | 7/1996 | Chu et al. | 370/60 |
| 5,553,239 | 9/1996 | Heath et al. | 395/187.01 |

OTHER PUBLICATIONS

U.S. Pat. Application 08/261,740, Hicks et al., filed Jun. 17, 1994. Now abandoned.
U.S. Pat. Application 08/631,037, Hicks et al., filed Apr. 12, 1996. A62 Continuation of 08/261,740.

"A Service Platform for Distributed Applications", Popescu-Zeletin et al, IEEE, pp. 11–16., Jul. 1992.

*Primary Examiner*—Thomas C. Lee
*Assistant Examiner*—Rehana Perveen
*Attorney, Agent, or Firm*—Blakely, Sokoloff, Taylor & Zafman

[57] ABSTRACT

An on-line/information service system is constituted with a caller management server and a number of on-line/information servers. The caller management server is equipped with multiple ports and complementary hardware/software, including a call management application, for managing multiple concurrent calls, which includes optionally validating the calls depending on whether services are provided on a callee service provider or caller basis, assigning and connecting the calls to corresponding on-line/information service delivery environments on the on-line/information servers. The on-line/information servers are equipped with adequate hardware/software, including an on-line/information service manager application and a number of on-line/information service applications, to support multiple on-line/information service delivery environments. Each on-line/information service delivery environment is equipped with streamlined application sharing host services, thereby allowing end-user PC equipped with streamlined application sharing client services to access on-line/information services provided by the on-line/information service applications.

12 Claims, 18 Drawing Sheets

SYSTEM FOR ACCESSING/DELIVERING ON-LINE/INFORMATION SERVICES VIA INDIVIDUALIZED ENVIRONMENTS USING STREAMLINED APPLICATION SHARING HOST AND CLIENT SERVICES

BACKGROUND OF THE INVENTION

1. Field of the Invention

The present invention relates to the fields of computer systems and on-line/information services.

2. Background Information

Advances in computer technology continue to bring forth more powerful, and yet at the same time more affordable personal computer systems (PC), leading to increasing number of PCs being acquired by end users for home applications. At the same time, advances in telecommunication technology are allowing these PCs to be networked with other computers. As a result, one particular type of home applications that is of increasing interest is on-line/information services. Particular examples of on-line/information services include news, bulletin, home shopping, home banking etc.

Today, most on-line/information services are delivered through "intermediate" service providers. In other words, a third "intermediate" party other than the "real" service provider is always involved. The "real" service provider is a bank providing home banking services, a department store providing home shopping services etc., and what the third "intermediate" party provides is access service for the home user, and delivery service for the "real" service provider. Particular examples of these "intermediate" on-line/information service providers include America On-line, Prodigy etc.

These access/delivery approaches all have the common inherent disadvantage of requiring the services to be accessed/delivered through an intermediary. Furthermore, these access/delivery approaches also have the common disadvantage of requiring installation of an "intermediate" provider's proprietary software before access/delivery of the service can be performed. Thus, it is desirable if access/delivery of on-line/information services can be made without the employment of intermediary service providers.

The advent of Internet and World-Wide-Web (WWW) provides a partial alternative approach to the employment of intermediary service providers. Under the Internet and WWW approach, a home user can request information or service from a service providing server maintained by the "real" service provider directly, without going through an intermediary access/delivery service provider. However, the Internet and WWW approach still has the inherent disadvantage that certain intermediary software implementing the Internet protocol must be employed on the server and the home user PC. While commercial versions of Internet protocol implementing software such as MOSAIC or Netscape are readily available in the market place, nevertheless, it still means the "real" service provider has to provide the Internet protocol implementing software on his/her servers, and the home users must separately purchase and install the Internet protocol implementing software on his/her PC before the on-line/information services can be accessed/delivered.

In particular, when compared to the employment of a telephone for accessing/delivering information services, granted the functionality is not as rich, the usability from the user's perspective is still to be desirable. In the telephone case, there are no additional hardware nor software required of the user before he/she can use his/her telephone to access information services. Particular examples of using the telephone to access/deliver information services include stock quotations, bank account balance inquiries, fund transfers or payments etc.

As will be disclosed in more detail below, the present invention provides a more friendly, more efficient, and more cost effective approach to accessing/delivering "limited" information services or "full function" on-line services.

SUMMARY OF THE INVENTION

The desired results are advantageously achieved by constituting an on-line/information service system with a caller management server and a number of on-line/information servers. The caller management server is equipped with multiple ports and complementary hardware/software, including a call management application, for managing multiple concurrent calls, which includes optionally validating calls depending on whether services are to be provided on a callee service provider or caller basis, assigning and connecting the calls to corresponding on-line/information service delivery environments on the on-line/information servers. The on-line/information servers are equipped with adequate hardware/software, including an on-line/information service manager application and a number of on-line/information service applications, to support multiple on-line/information service delivery environments.

In one embodiment, the caller management server is a multi-processor server executing a network operating system that is compatible with the operating systems employed by the end-user PCs and the operating systems employed for the individual on-line/information delivery environments. In one embodiment, each of the on-line/information server is a massively parallel multi-processor computer system having N application supporting processors for executing N corresponding copies of like operating systems employed by the end-user PCs, with the exception that the operating system executing on each of the processor of the on-line/information server is incorporated with the streamlined application sharing (AS') host services of the present invention, whereas the operating system executing on each end-user PC is incorporated with the AS' client services of the present invention.

To access on-line/information service, an end-user PC would initiate a call to the on-line/information service system. The call management server would assign and connect the call to one of the on-line/information delivery environment. In some embodiments, the call management server would validate the call before assigning and connecting the call. The call management application also provides the particular executing copy of the on-line/information service manager with an application profile delineating on-line/information service of interest and/or authorized. In some embodiments, the application profile is provided based on the callee's telephone number/ID, whereas in other embodiments, the application profile is provided based on the caller's telephone number/ID.

In response, the on-line/information service manager would pseudo display a navigation/selection "home" menu, which would be automatically application shared onto the caller PC's display. The caller would make his navigation or selection choices interacting with the locally displayed shared menu. The interaction keystrokes and cursor control actions are forwarded to the on-line/information service manager. In response, the on-line/information service manager would either pseudo display another navigation/ selection menu or launch an appropriate on-line/information service application. The launched on-line/information service application would execute and pseudo display service information, which would also be automatically application shared onto the caller PC's display. Similarly, the caller would utilize the locally displayed shared on-line/information services, interacting with the displayed information. Again, the interaction keystrokes and cursor control actions would be forwarded to the on-line/information service applications, which would process them accordingly.

When the caller is finished with an on-line/information service application, control is returned to the on-line/information service manager. Eventually, when the caller is finished with all the desired services, control is returned to the caller management application, which in turn would terminate the call. In some embodiments, the on-line/information service applications and/or call management application also log various relevant billing information during the call, and upon termination save these logged information for subsequent billing purpose.

In one embodiment, the on-line/information service system further includes a local private exchange (PBX). The PBX is equipped with multiple line adapters and complementary hardware/software for switching multiple concurrent calls, routing them to the caller management server. In another embodiment, the switching service is provided by public exchanges. The PBX may be implemented using any number of PBX's known in the art, provided the line switching capability is commensurate with the anticipated concurrent call load to be supported. During operation, the PBX is used to answer and connect calls to the call management server.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
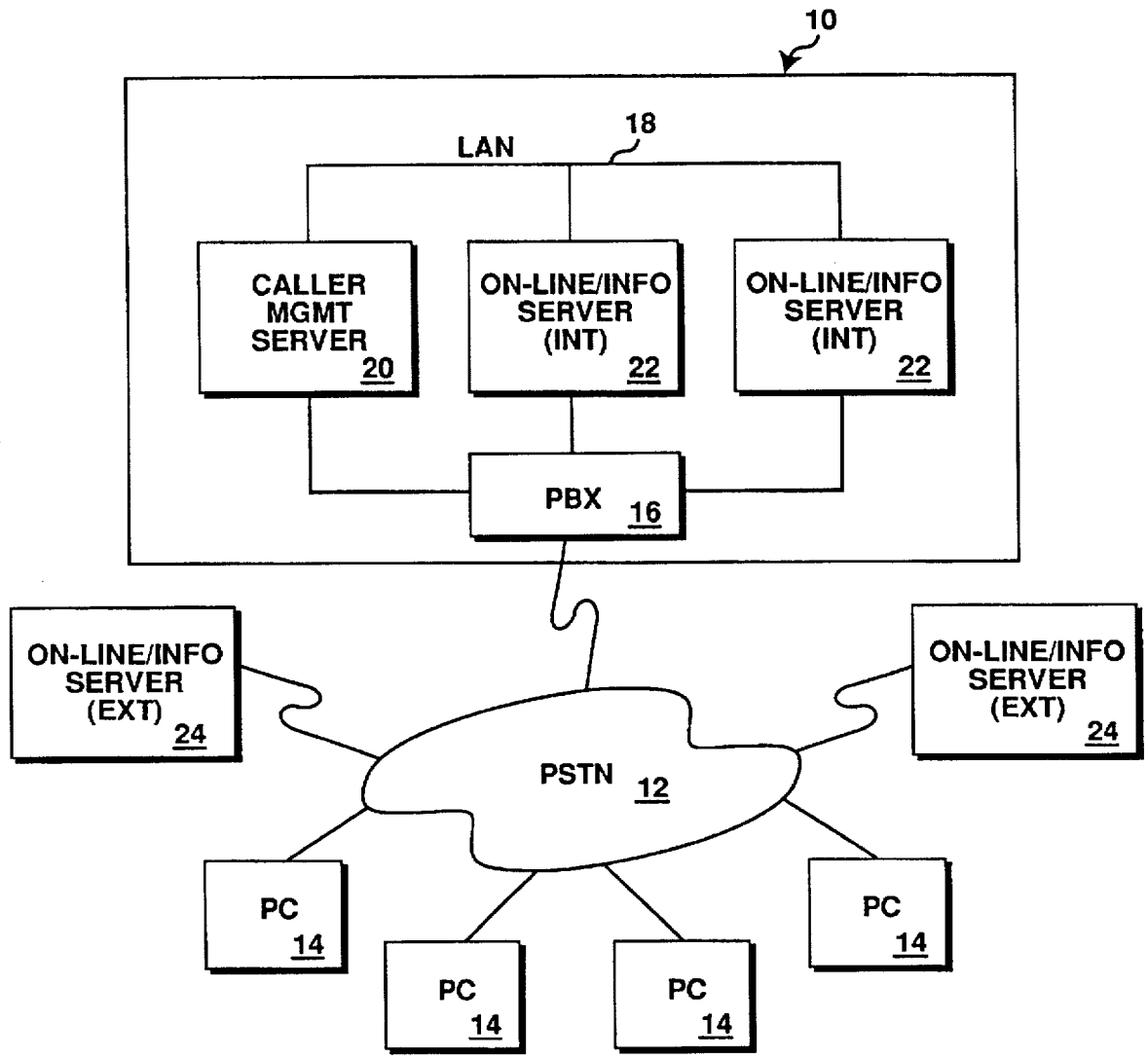
FIG. 1 illustrates an exemplary on-line/information service delivery network incorporating the on-line/information service system of the present invention.

Referring now to FIG. 1, an exemplary on-line/information service delivery network incorporated with the teachings of the present invention is illustrated. The exemplary network comprises on-line/information service system 10 constituted in accordance to the teachings of the present invention for providing on-line/information services, and end-user PCs 14 accessing these services provided by on-line/information service system 10 through Public Switching Telephone Network (PSTN). On-line/information service system 10 includes a caller management server 20 and a number of on-line/information servers 22. For the illustrated embodiment, on line/information service system 10 further includes a local private exchange (PBX) 16. The various servers 20 and 22 are coupled to each other through a local area network (LAN) 18. PBX 16, when present, is directly coupled to the various servers 20 and 22. Caller management server 20 is equipped with multiple ports and complementary hardware/software, including a call management application, for managing multiple concurrent calls, which includes validating the calls, assigning and connecting the calls to corresponding on-line/information service delivery environments on on-line/information servers 22. On-line/information servers 22 are equipped with adequate hardware/software, including an on-line/information service manager application and a number of on-line/information service applications, to support multiple on-line/information service delivery environments. In particular, on-line information servers 22 are equipped with AS' host services of the present invention for automatically application sharing displays of the on-line/information service applications with PC 14. PBX 16, if employed, is equipped with multiple line adapters and complementary hardware/software for switching multiple concurrent calls, routing them to caller management server 20. PBX 16 and LAN 18 perform their conventional functions. Both are well known in the art, and will not be further described. Servers 20 and 22 will be described in more detail with additional references to the remaining figures.

PSTN 12 is also well known and will not be further described either. However, it should be noted that the present invention may be practiced with other types of network including but not limited to ISDN or LAN. Each of PCs 14 is equipped with the AS' client services of the present invention. Except for the AS' client services, PCs 14 are intended to represent a broad category of personal computers known in the art, whose functions and constitutions are well known, and therefore will not be further described. Additionally, as will described in more detail below, the present invention may also be practiced with on-line information service system 10 delivering services in conjunction with other "external" on-line/information servers 24.

Figure 2:
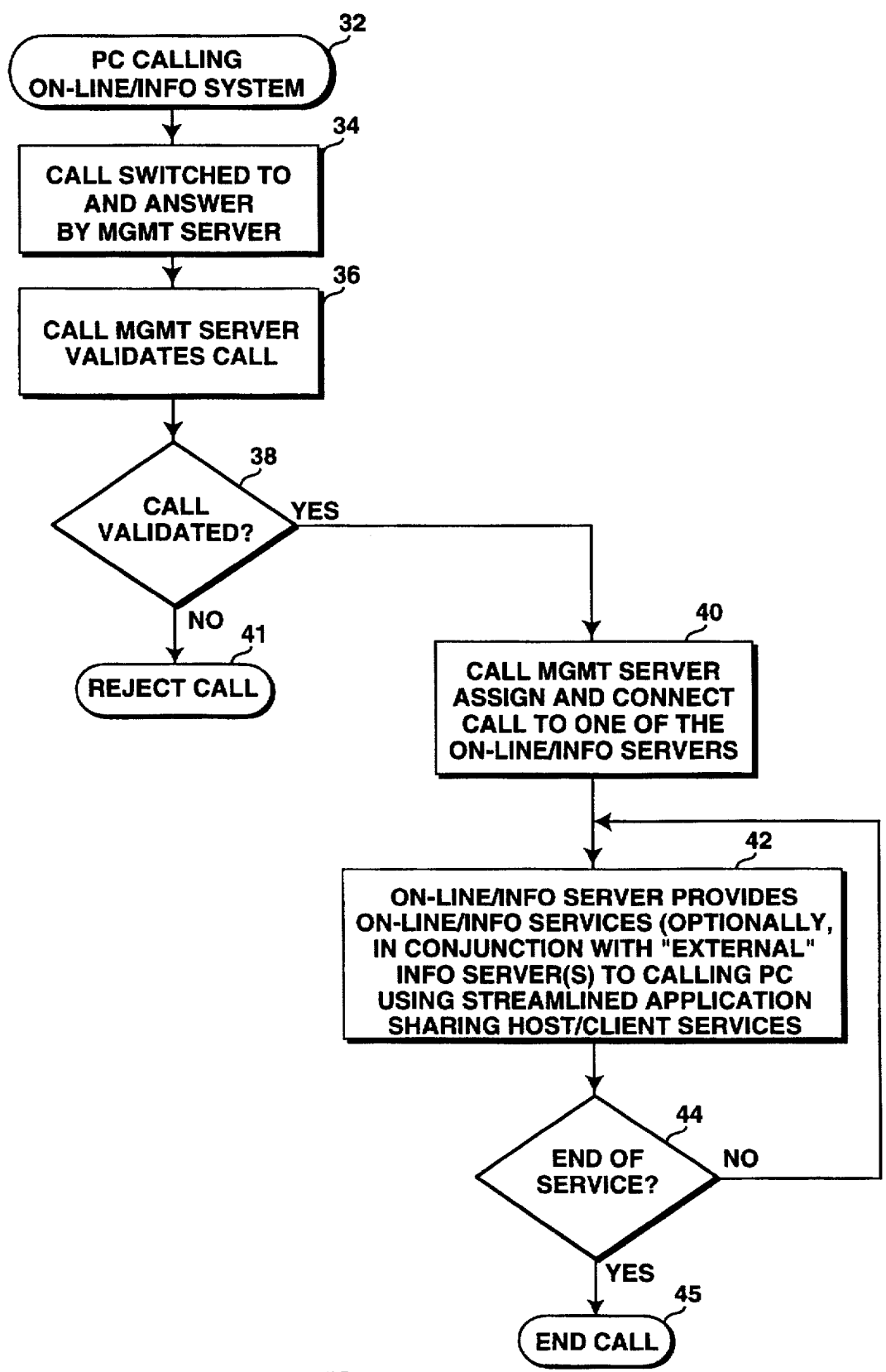
FIG. 2 is an overview of the method steps of the present invention for accessing/delivering on-line/information services.

FIG. 2 illustrates the overall method steps of the present invention for accessing/delivering on-line/information services. As shown, during operation, to access on-line/information service, an end-user PC 14 would initiate a call to the on-line/information service system 10, step 32. The call would be switched to and answered by call management server 20, step 34. In some embodiments, in particular, those systems providing services on a caller basis, to be described more fully below, call management server 20 would validate the call, step 36. If the call is not validated, step 38, the call would be rejected, step 39, otherwise, call management server 20 would assign and connect the call to one of the on-line/information server 20, step 40. The assigned on-line/information server 22 would then service the call using the incorporated AS' host and client services on server 22 and PC 14 respectively, step 42. After PC 14 has obtained all desired services, step 44, the call would be terminated, step 45.

Figure 3A:
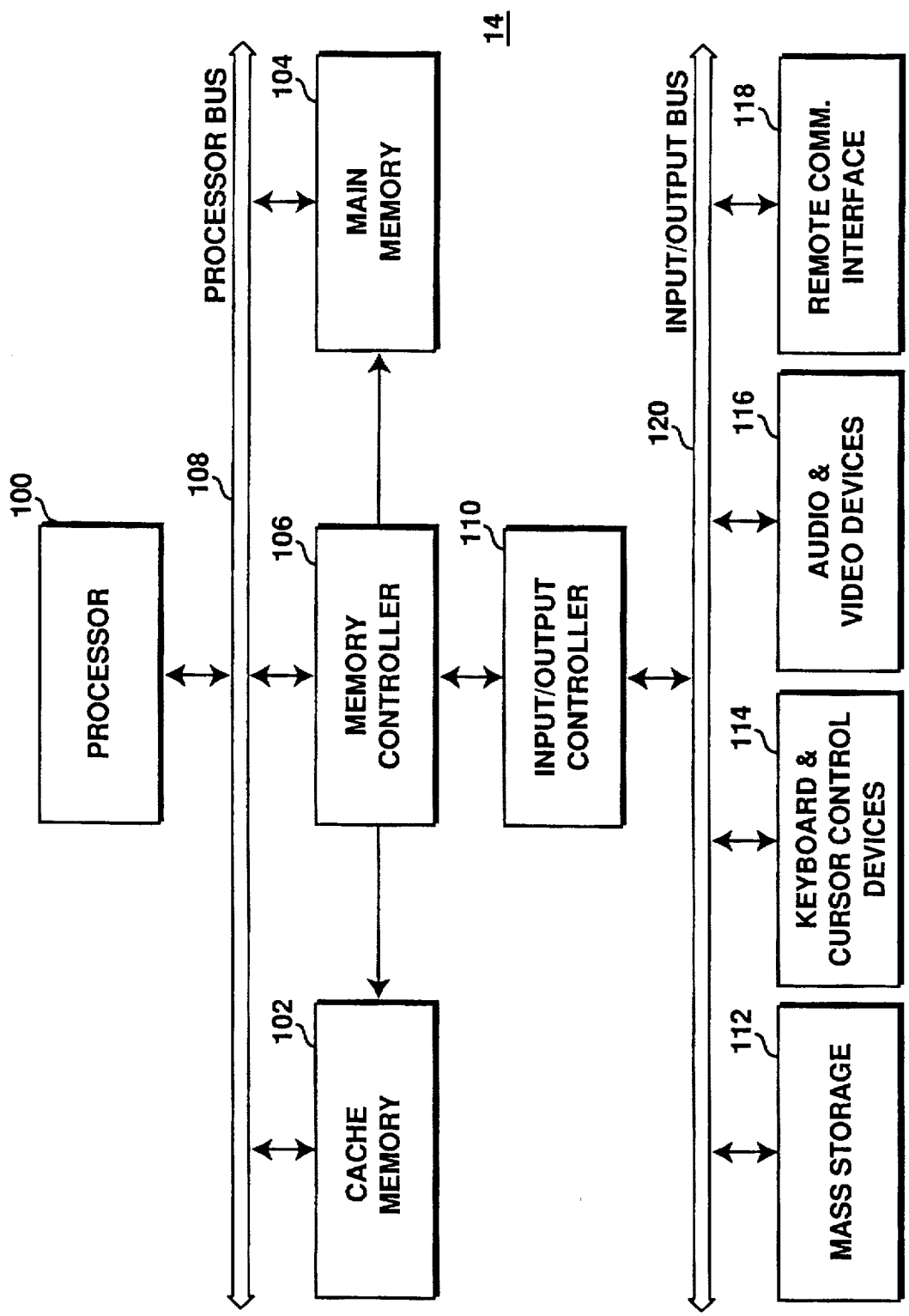
FIGS. 3a–3c are hardware, software, and end user views of an exemplary on-line/information service client PC.
Figure 3B:
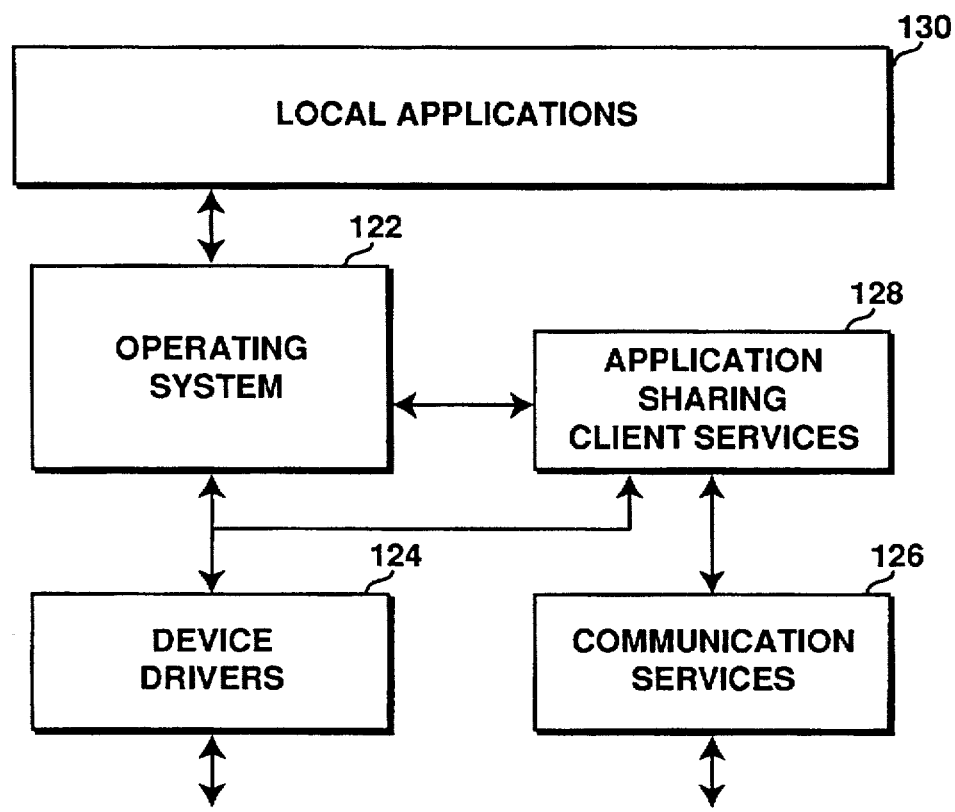
Figure 3C:
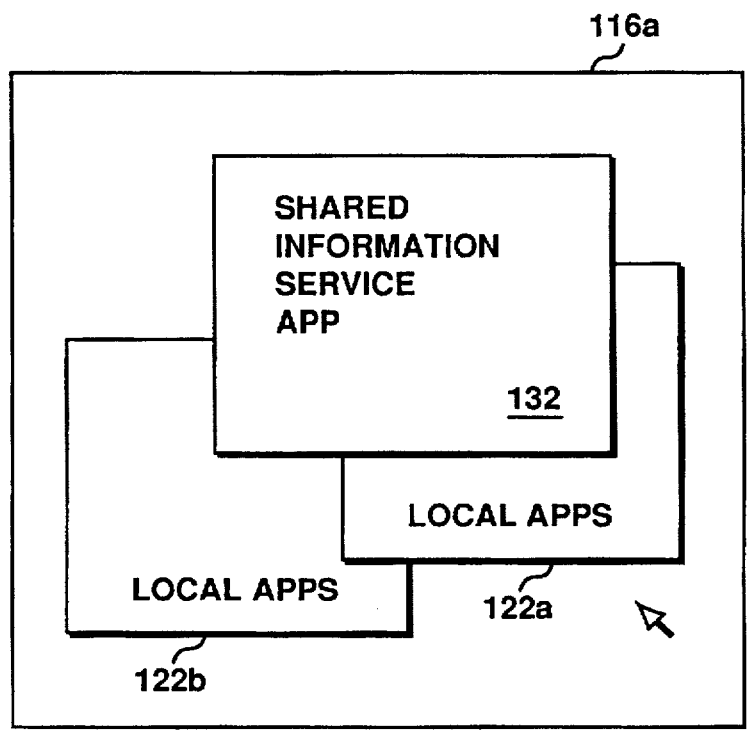

Having described on-line/information service system 10 of the present invention and the manner in which it interacts with end-user PCs 14 at a high level, we will now proceed to describe the various components in further detail. Referring now to FIGS. 3a–3c, wherein hardware, software, and end-user views of one embodiment of PC 14 of FIG. 1 are shown. As illustrated in FIG. 3a, for this embodiment, PC 14 includes processor 100, cache memory 102, main memory 104, memory controller 106, and processor bus 108 coupled to each other. Additionally, PC 14 further includes input/output (I/O) controller 110, mass storage 112, keyboard and cursor control devices 114, audio and video devices 116, remote communication interfaces 118, and I/O bus 120 coupled to each other. Furthermore, memory controller 106 and I/O controller 110 are coupled to each other. Each of elements 100–120 performs its conventional function known in the art. Their constitutions are well known and will not be further described.

As shown in FIG. 3b, under this embodiment, PC 14 is equipped with operating system 122, device drivers 124, communication services 126 and AS' client services 128 of the present invention. Additionally, PC 14 may also be equipped with local applications 130, i.e. applications other than the "service applications" provided remotely by on-line/information servers 22. Except for AS' client services 128, elements 122–130 also perform their conventional functions known in the art. Their constitutions are also well known and will not be further described. AS' client services 128 will be described in more detail below.

As shown in FIG. 3c, for this embodiment, PC 14 also includes a windowed graphical end user interface 116a comprising windowed displays of shared on-line/information service application 132 as well as windowed displays of local applications 122a–122b. As will be described in more detail below, displays of the on-line/information service applications are automatically application shared onto PC 14 while they are being pseudo-rendered on the on-line/information server 22.

Figure 4A:
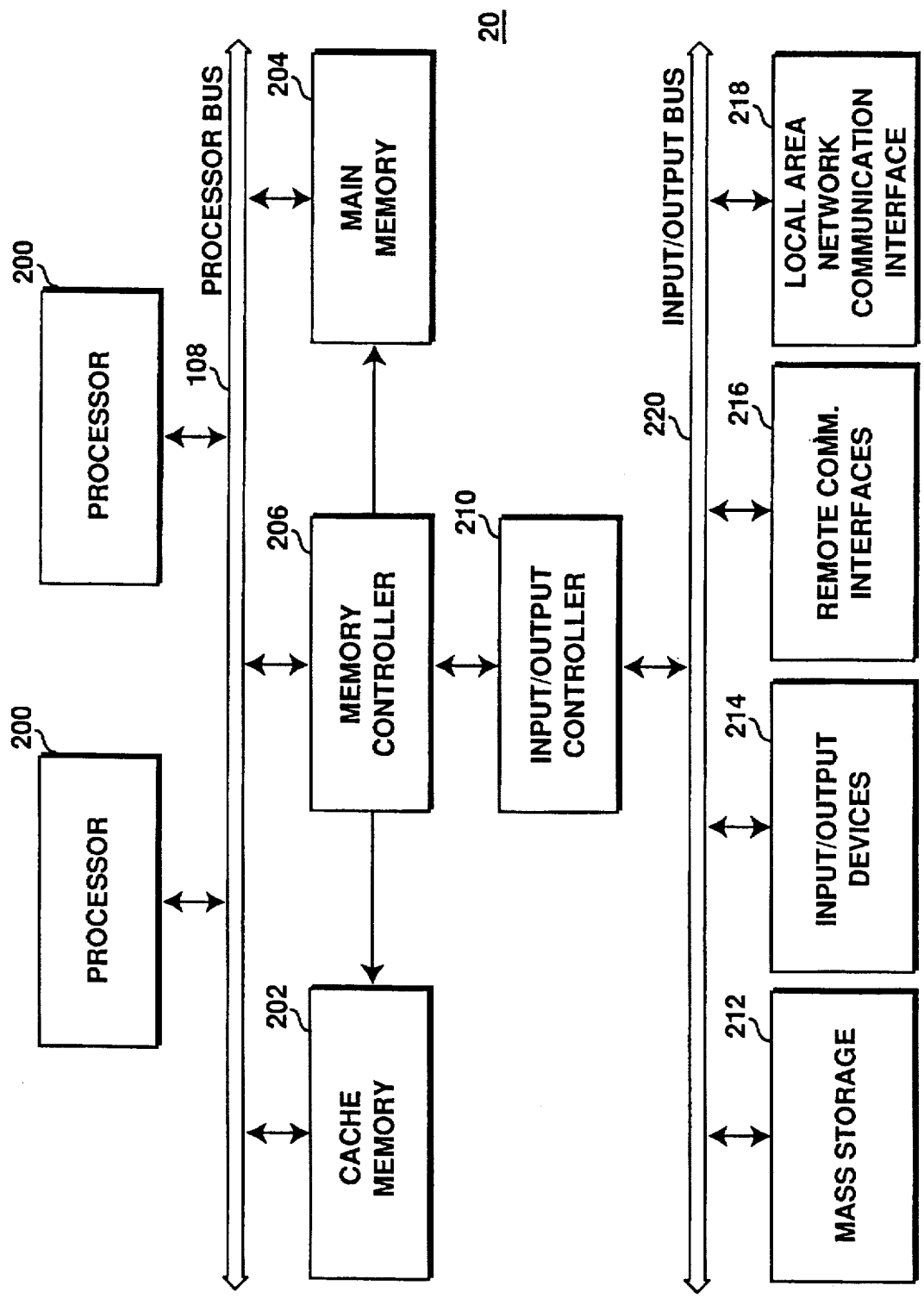
FIGS. 4a–4b are hardware and software views of an exemplary caller management server.
Figure 4B:
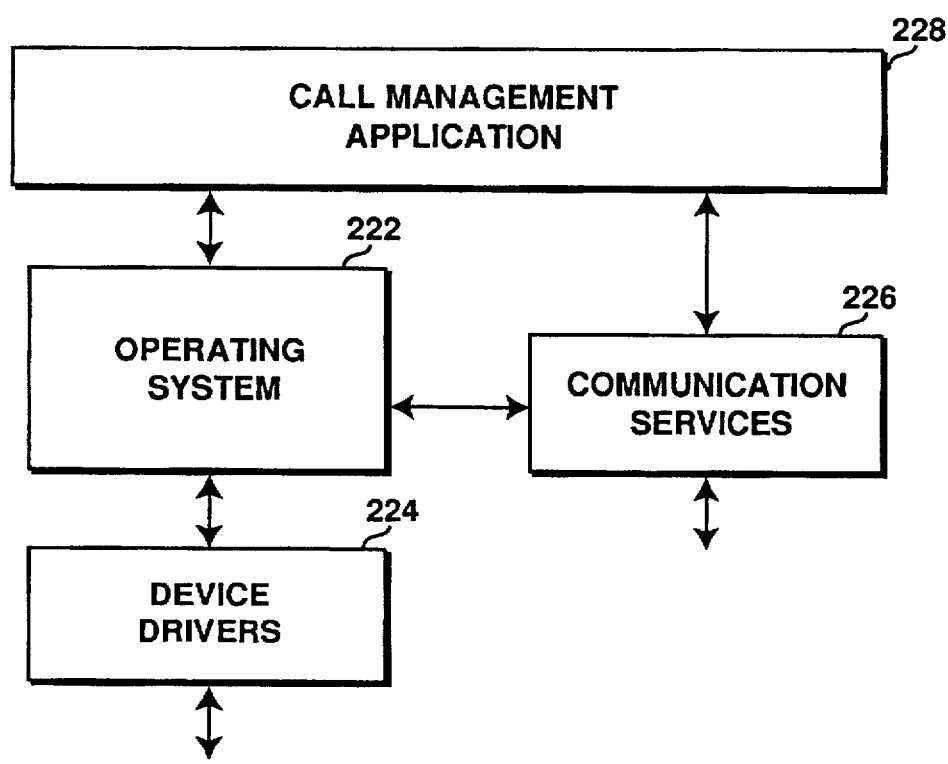

Referring now to FIGS. 4a–4b, wherein hardware and software views of one embodiment of caller management server 20 are shown. As illustrated in FIG. 4a, caller management server 20 is similarly constituted as PC 14, except it comprises multiple higher performance processors 200, communication interfaces 216 capable of handling multiple concurrent calls routed from PBX 16, and a LAN communication interface 218 for communicating with on-line/information servers 22. As illustrated in FIG. 4b, for this embodiment, caller management server 20 is also similarly equipped with operating system 222, device drivers 224, and communication services 226. However, it is not equipped with any AS' client services. Instead, it is equipped with a caller management application 228, which will be described in more detail below.

Figure 5A:
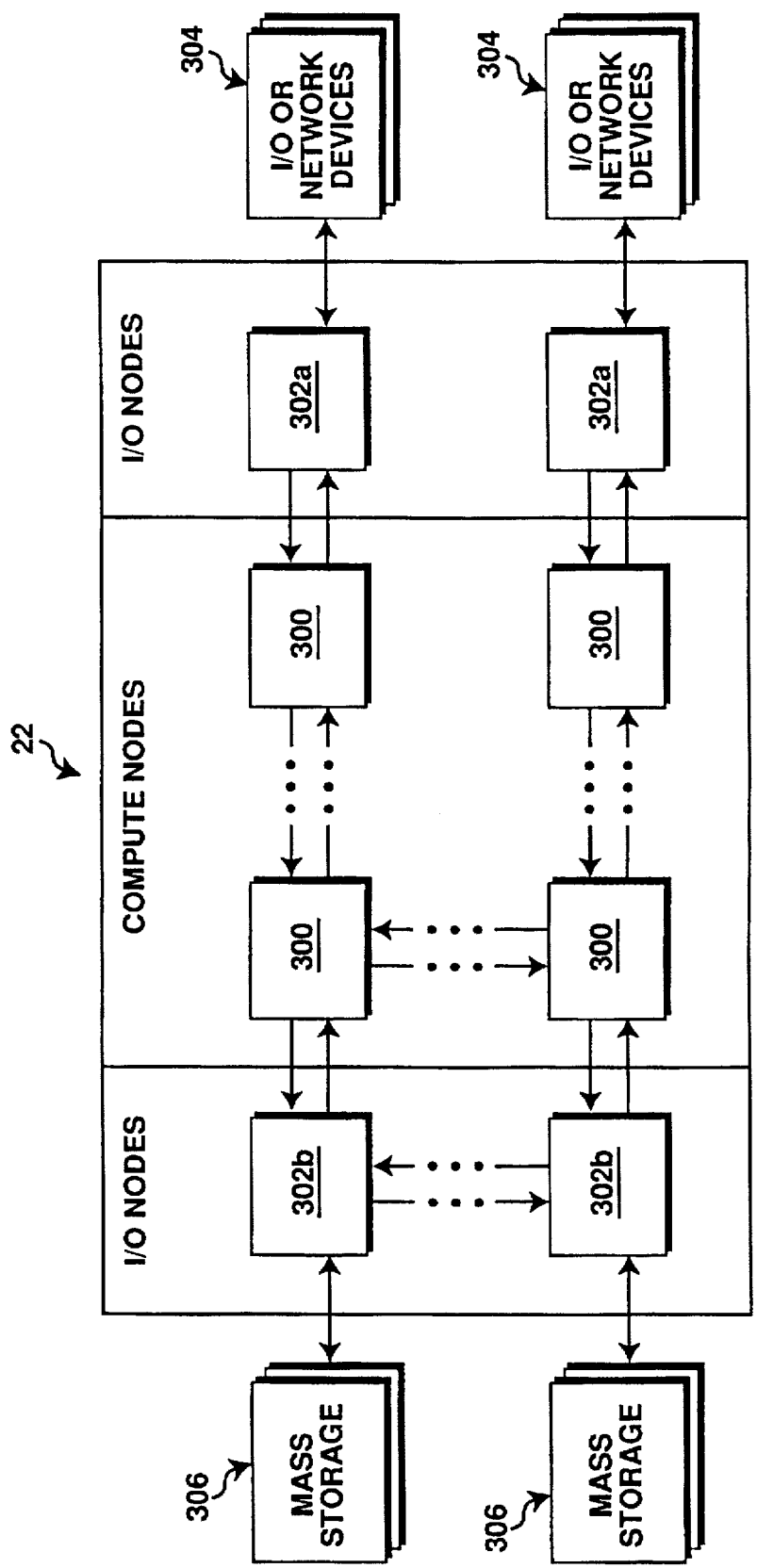
FIGS. 5a–5b are hardware and software views of an exemplary on-line/information server.
Figure 5B:
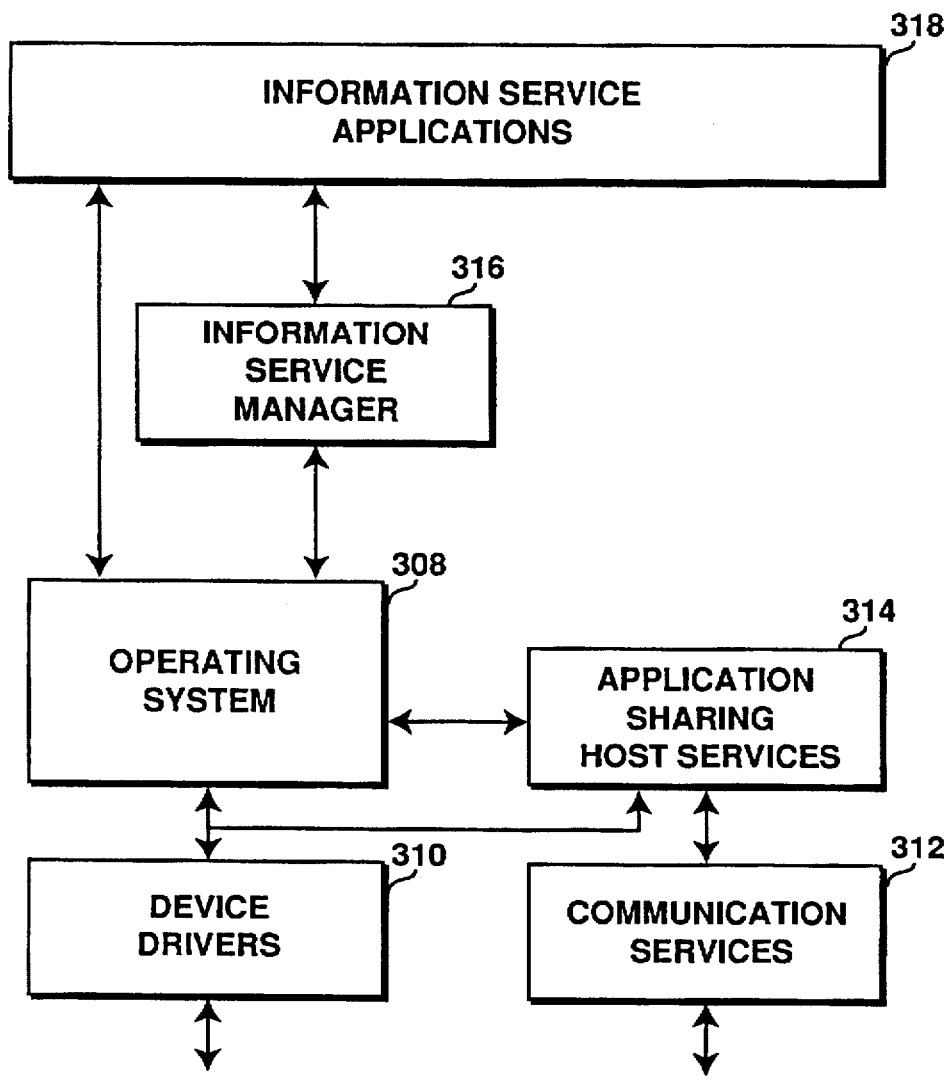

Referring now to FIGS. 5a–5b, hardware and software views of one embodiment of on-line/information server 22 of FIG. 1 are shown. As illustrated in FIG. 5a, for this embodiment, on-line/information server 22 includes a number of massively parallel processors 300, 302a and 302b. Some of the processors 300 are dedicated to provide on-line/information service environments, one on-line/information service environment per processor 300. Other processors 302a–302b are dedicated to access I/O or network devices 304 or mass storage's 306. The illustrated on-line/information server 22 is intended to represent a broad category of high performance servers known in the art. Their constitutions are also known and will not be further described. As illustrated in FIG. 5b, under this embodiment, each on-line/information service environment is similar equipped as each PC 14 including operating system 308, device drivers 310, and communication services 312. Additionally, each on-line/information service environment is also equipped with AS' host services 314, a copy of information service manager 316 and copies of a number of on-line/information service applications 318. AS' host service 314 is used to automatically application share displays of on-line/information service manager and applications 316 and 318 onto PC 14. On-line/information service manager 310 is used to control navigation among the interested or authorized on-line/information services, whereas on-line/information service applications 318 are used to provide on-line/information services.

Before proceeding to describe PC 14, caller management server 20, and on-line/information server 22 in further detail, it should be noted that those skilled in the art would appreciate that numerous embodiments functionally equivalent to those described earlier are available, and the present invention may be practiced with any number of these equivalent embodiments. In particular, on-line/information server 22 may simply be a multi-processor server equipped with an operating system that is capable of providing "individualized" on-line/information service environments, one for each calling PC 14.

Figure 6A:
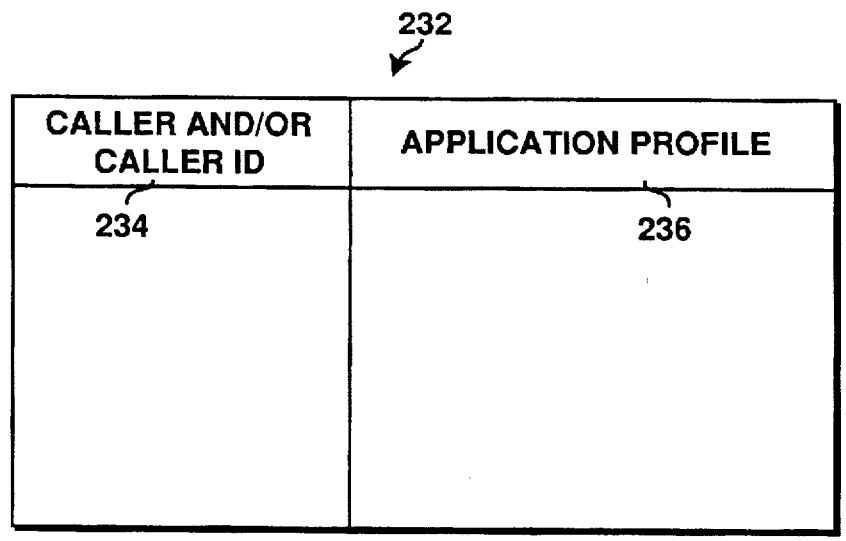
FIGS. 6a–6b illustrate some of the essential data maintained by the caller management server.
Figure 6B:
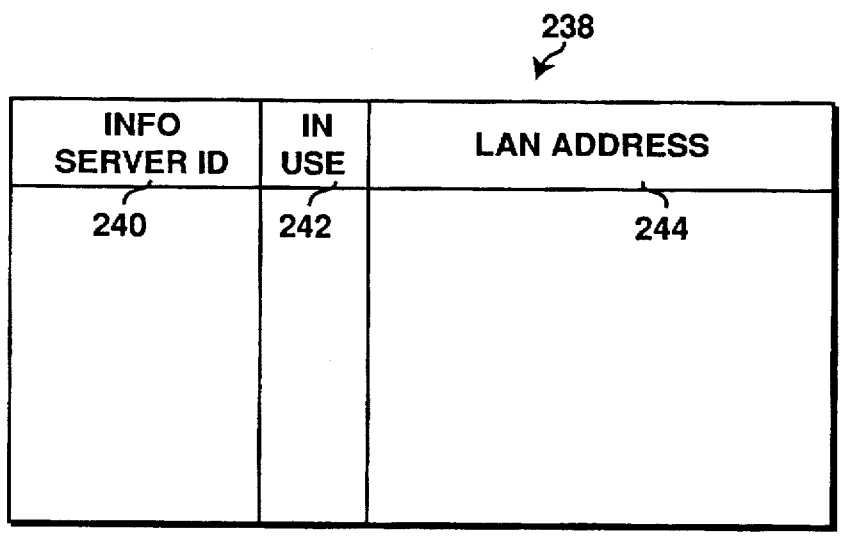

Referring now to FIGS. 6a–6b, wherein the essential data maintained by caller management server 20 are shown. As illustrated by the embodiment shown in FIG. 6a, caller management server 20 maintains a table 232 of callee and/or caller IDs 234, depending on the basis for providing services, and their corresponding application profiles 236. Callee/Caller IDs 234 identify the callee service provider/calling PCs 14. Application profiles 236 describe the on-line/information service interested or authorized for the identified callee service provider/calling PC 14. As illustrated by the embodiment shown in FIG. 6b, caller management server 20 further maintains another table 238 of on-line/information server processor IDs 240, their usage status 242 and LAN address 244. On-line/information server process IDs 234 identify the service processors 300 of servers 22. Usage status 242 denote whether the corresponding processors 300 are in use, and LAN addresses 244 denote the address of the processors 300.

Figure 7:
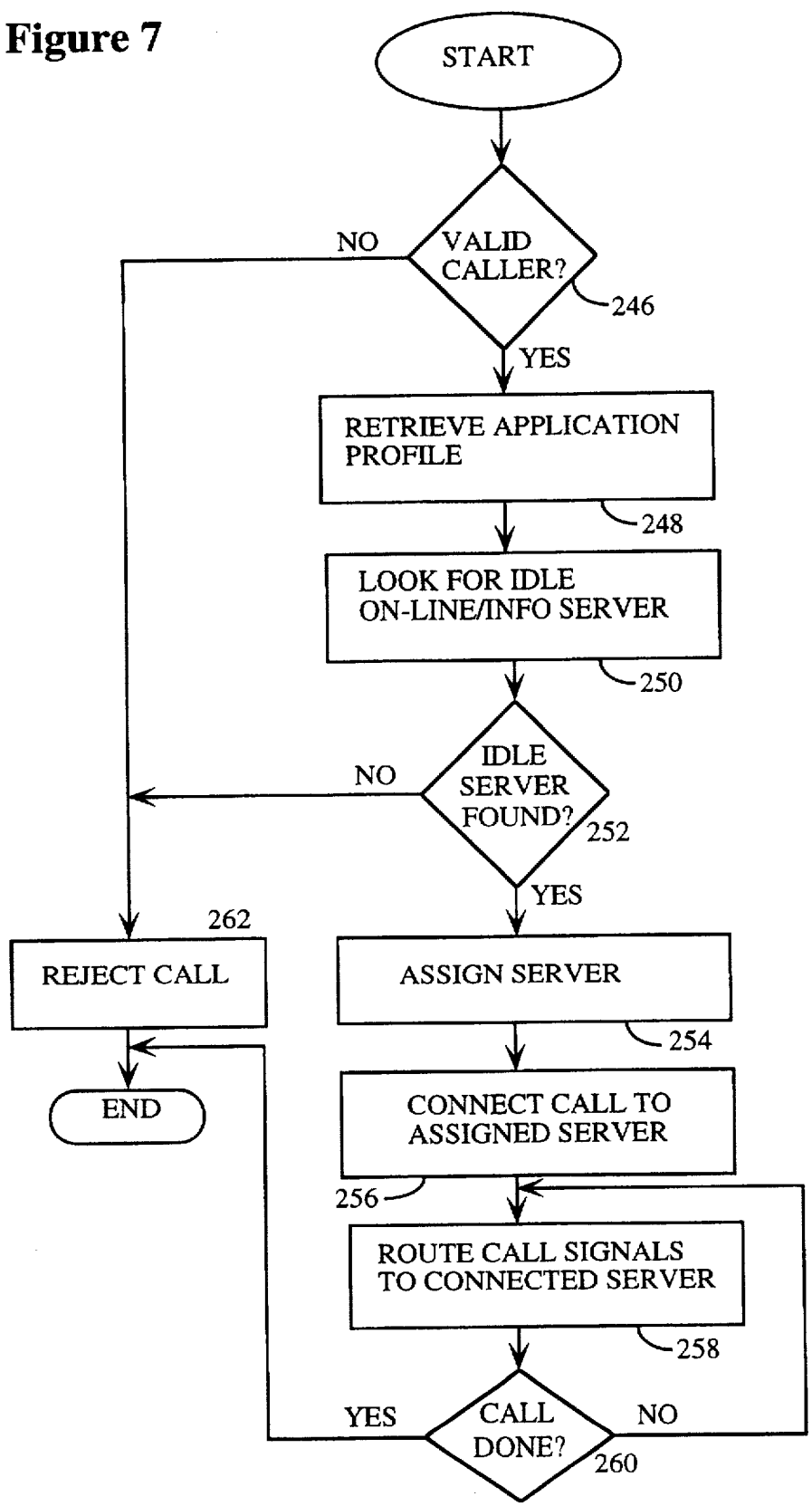
FIG. 7 illustrates one embodiment of the operation flow of the caller management application executing on the caller management server.

Referring now to FIG. 7, wherein one embodiment of the operation flow of caller management application 228 is illustrated. As shown, for those embodiments where services are provided on a caller basis, caller management application 228 first looks up the calling PC's caller ID 234 in caller ID table 232, step 246. If no match is found, step 248, call management application 228 rejects the call, step 262. If a match is found, or unconditionally for those embodiments where services are provided on the callee basis, the corresponding application profile is retrieved, step 248. Caller management application 228 then looks for an idle on-line/information service environment, i.e. an idled processor 300 for the above described embodiment, step 250. If no idle on-line/information service environment is found, step 252, caller management application 228 also rejects the call, step 262. If an idle on-line/information service environment is found, step 252, caller management application 228 assigns and connects the call to the located on-line/information service environment, steps 254–256. Next, caller management application 228 routes call signals to the assigned on-line/information service environment, step 258. Caller management application 228 continues the routing until the call is completed, step 260.

Figure 8:
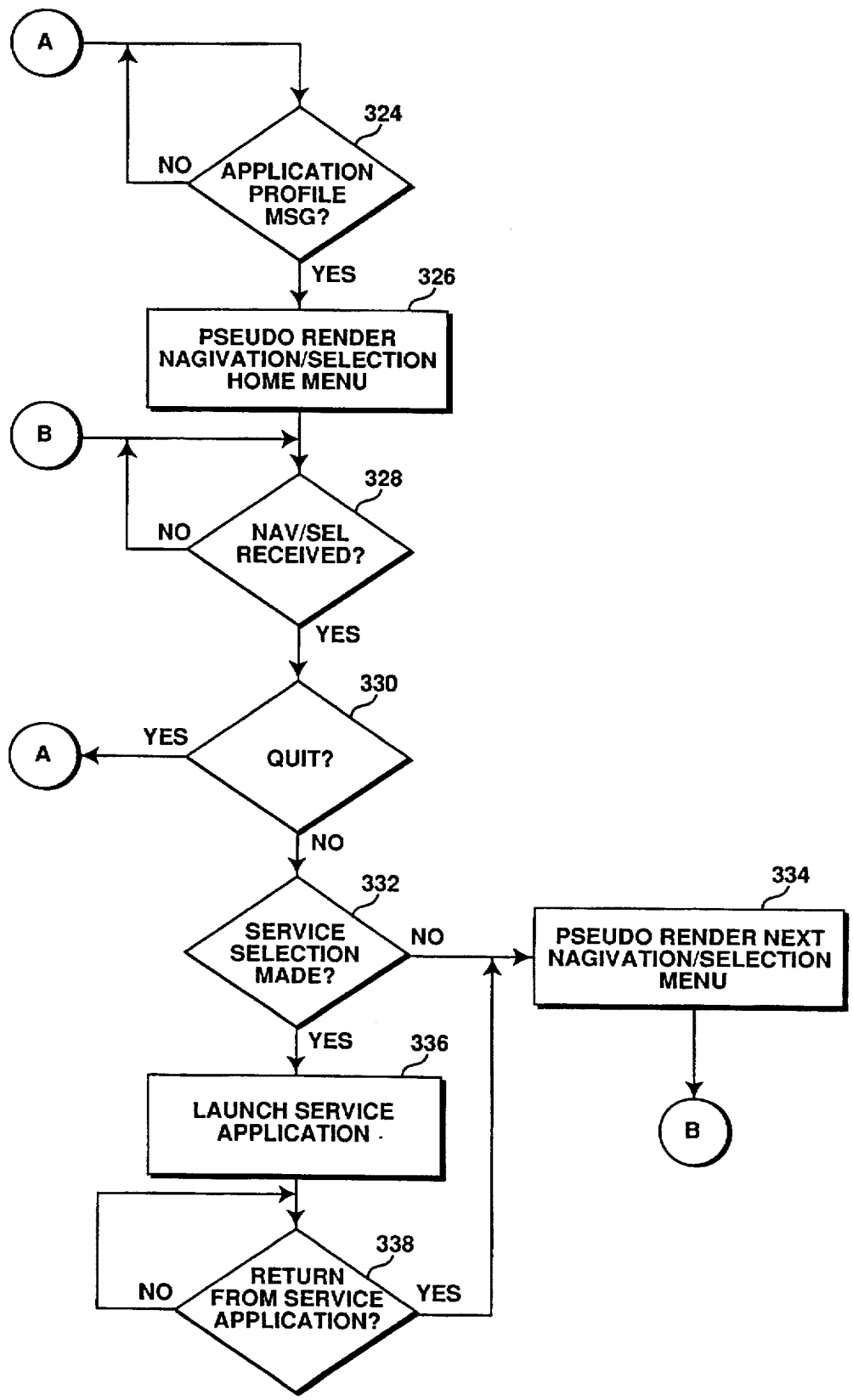
FIG. 8 illustrates one embodiment of the operation flow of the on-line/information service manager executing in one of the on-line/information service delivery environments of an on-line/information server.

Referring now to FIG. 8, wherein one embodiment of the operation flow of on-line/information service manager 316 is shown. As illustrated, during operation, on-line/information service manager 316 monitors for application profile messages transmitted by caller management application 228, step 324. Upon receipt of an application profile, on-line/information service manager 316 pseudo renders a navigation/selection menu, step 326. As described earlier, the navigation/selection menu being pseudo rendered is automatically application shared onto the calling PC 14. Pseudo rendering and automatic application sharing of displays will be described in more detail below. Upon pseudo rendering the navigation/selection menu, on-line/information service manager 316 monitors for navigation/selection inputs from the calling PC 14, step 328. The manner in which navigation/selection inputs made on calling PC 14 are provided to on-line/information service manager 316 will be described in more detail below.

Upon detecting a navigation/selection input, on-line/information service manner 316 determines if user PC 14 has selected to quit the on-line/information services, step 330. If user PC 14 has selected to quit, on-line/information service manager 316 returns to monitoring for additional customer profile messages, step 324. On the other hand, if user PC 14 has not selected to quit, on-line/information service manager 316 further determines if a service selection has been made, step 332. If a service selection has not been made, on-line/information service manager 316 pseudo renders a "new" navigation/selection menu responsive to the navigation/selection input received, step 324. As described earlier, the "new" navigation/selection menu will be automatically application shared onto user PC 14. Upon pseudo rendering the "new" navigation/selection menu, on-line/information service manager 316 returns to monitoring for navigation/selection inputs from user PC 14, step 328.

Back at step 332, if a service selection was made, on-line/information service manager launches the appropriate service application 318, step 336. In some embodiments, step 336 may include remotely launching service applications on an "external" on-line/information server 24. Upon launching a service application 318, on-line/information service manager 316 waits for the return from the launched application 318. Upon returning from the launched service application 318, on-line/information service manager 316 repeats steps 334 and 328 again.

Figure 9:
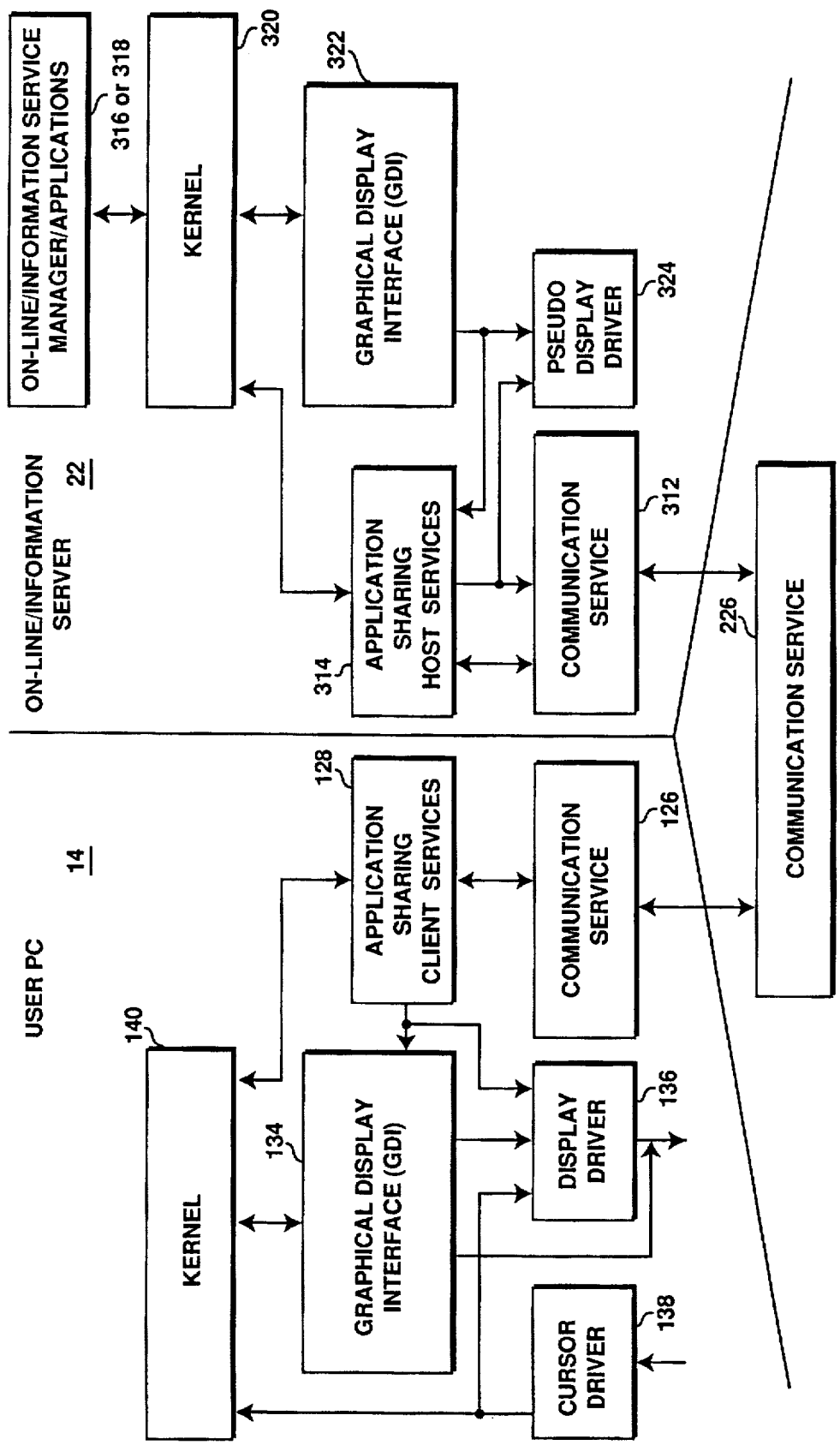
FIG. 9 is an architectural view of the present invention for accessing/delivering on-line/information services using AS' services.

Referring now to FIG. 9, wherein an architectural view AS' of the present invention is shown. As illustrated, on-line/information service manager/applications 316 or 316 calls the kernel 320 of the operating system to render certain display. As will be obvious from the descriptions to follow, under the present invention, the on-line/information service manager/applications 316 and 318 may be advantageously implemented in a manner that it is not cognizant of the fact that the interacting end-user is remotely located. Manager/applications 316 and 318 are implemented as if the interacting end-user is local. Kernel 320 in turn calls a graphical display interface (GDI) 322 to render the display, which in turn calls a pseudo display driver 324 to "render" the display. Pseudo display driver 324 do not actually render the display on any display at all. Pseudo display driver 324 is employed to facilitate substitution with "real" display driver, to allow live interaction between the end user of PC 14 and a service representative connected to the on-line/information server 22.

AS' host services 314 monitor and intercept all calls from GDI 322 to pseudo display driver 324. Pseudo display driver 324 includes an input buffer allowing its calls to be "intercepted". AS' client services 128 are notified by AS' host services 314 whenever a display device driver call from GDI 322 is intercepted. Upon being notified, AS' client services 128 would then cause the display to be rendered directly by calling the local GDI 134, or indirectly by calling the local display driver 136 first.

For keyboard and cursor control interactions on end-user PC 14 that are related to the "projected" or "shared" display, upon being notified by cursor driver 138, kernel 140 of the local operating system would notify AS' client services 128. AS' client services 128 would in turn notify AS' host services 134. AS' host services 314 would then notify kernel 320, which in turn would notify the owner of the "projected" or "shared" display, i.e. on-line/information service manager/applications 316 or 318. Kernel 140 includes keyboard and cursor control action input queues.

Figure 10A:
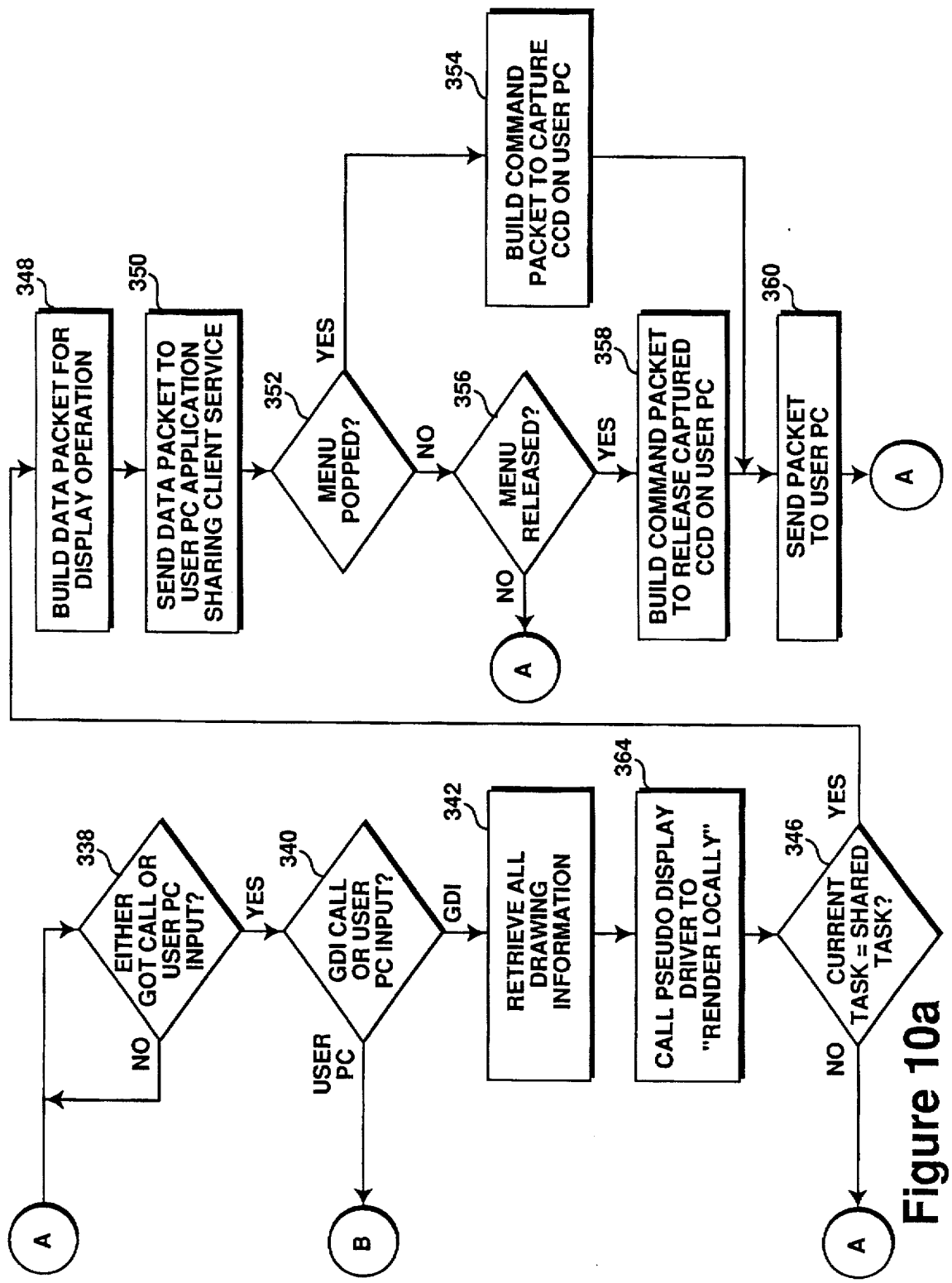
FIGS. 10a–10b illustrate one embodiment of the operation flow of the AS' host services under the present invention.
Figure 10B:
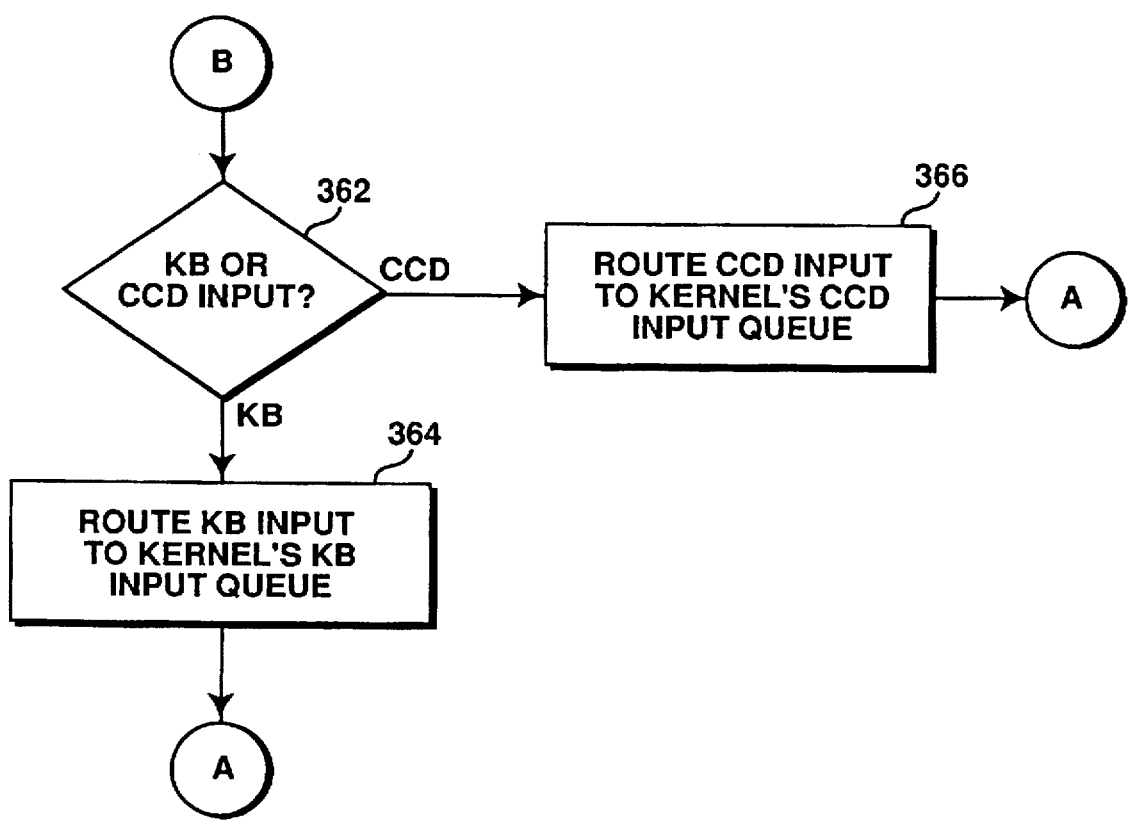

FIGS. 10a–10b illustrate one embodiment of the operation flow of AS' host services 314. As shown, during operation, AS' host services 314 monitor for GDI calls or user PC inputs, steps 338 and 340. Upon detection of a GDI call, AS' host services 314 retrieve all drawing information from pseudo device driver's input buffer, step 342. As described earlier, preferably AS' host services 314 would call pseudo device driver 324 again. Next, AS' host services 314 determine if the current task is a shared task, step 346. If the current task is not a shared task, AS' host services 314 take no further action, and return to monitoring for additional GDI calls or user PC inputs. However, if the current task is a shared task, AS' host services 314 build a data packet in accordance to the retrieved drawing information, step 348, and then send the data packet to user PC's AS' client services 128, step 350.

Upon sending the data packet, AS' host services 314 further determine if the display is the "draw down" or "pop up" of a menu, step 352. If the display is related to the "draw down" or "pop up" of a menu, AS' host services 314 further cause a command packet to be sent to user PC's AS' client services 128 to "capture" the cursor control device, step 354. Capturing of a cursor control device means from here on forward, until released, all cursor button actions, regardless of whether they are within the windowed display "owned" by AS' client services 138 or not, they are to be considered as if they took place within the windowed display "owned".

If the display is not related to the "draw down" or "pop up" of a menu, AS' host services 314 further determine if the display is related to the "release" of a previously "drawn down" or "popped up" menu, step 356. If not, AS' host services 314 take no further action, and return to monitoring for new GDI calls or user PC inputs. If the display is related to the "releasing" of a menu, AS' host services 314 build a command packet, instructing user PC's AS' client services 138 to release the previously captured cursor control device, step 358, and send the command packet to user PC's AS' client services 138, step 360.

If back in steps 338 and 340, it was user PC's input that was detected, as shown in FIG. 10b, AS' host services 314 would further determine whether the input is a keyboard input or a cursor control input, step 362, and route them to the appropriate input queue of kernel 320, steps 364 and 366.

Figure 11A:
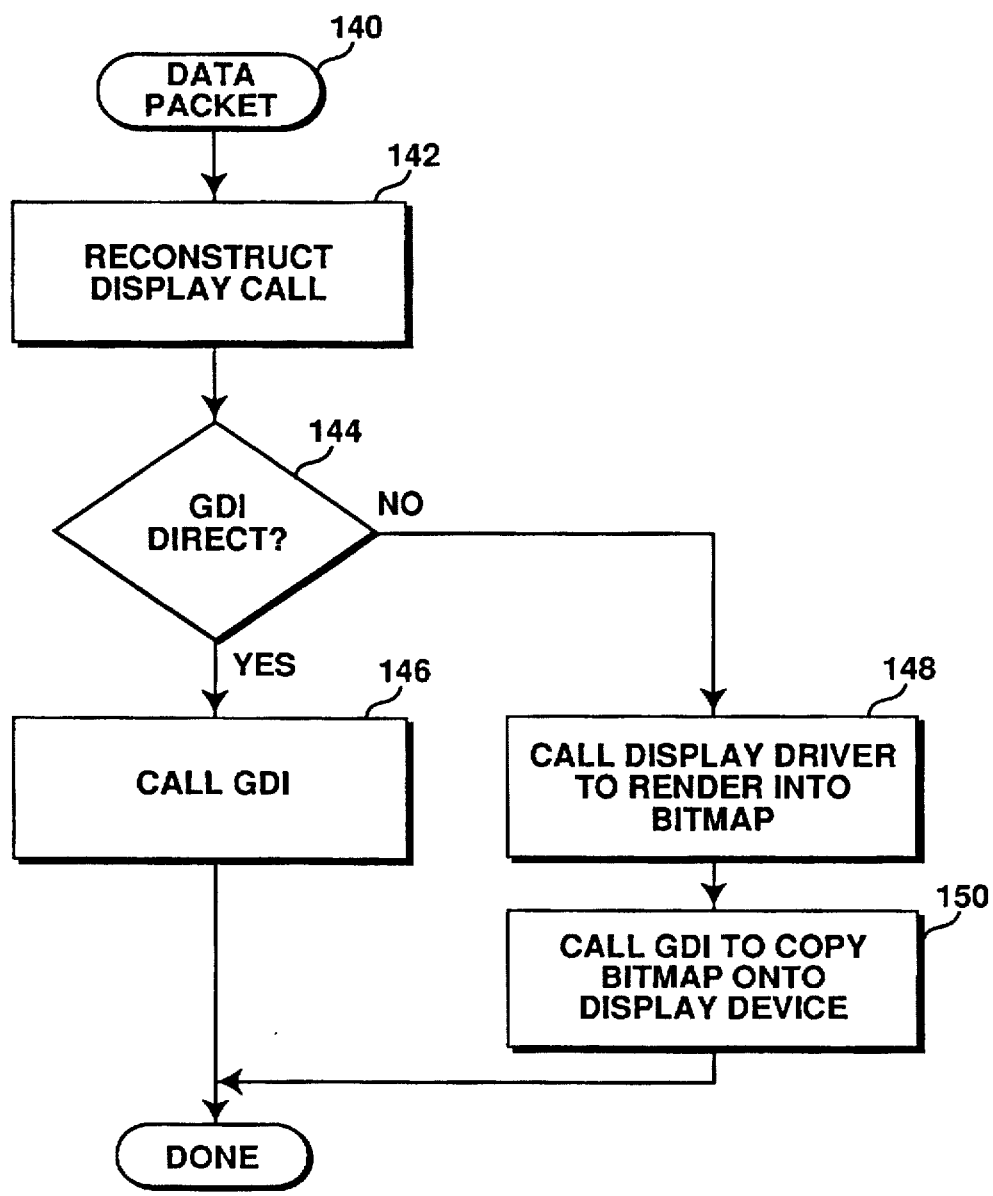
FIGS. 11a–11d illustrate one embodiment of the operation flow of the AS' client services under the present invention.

FIGS. 11a–11d illustrate one embodiment of the operation flow of AS' client services 138. As shown in FIG. 11a, in response to the receipt of a data packet, AS' client services 138 reconstruct the display call, step 142. Next, AS' client services 138 determine if the reconstructed display call is a GDI direct or indirect call, step 144. If it is determined to be a direct call, AS' client services 138 call GDI directly, step 146. Otherwise, AS' client services 138 first call display driver 136 to render the display into a bitmap, step 148, before calling GDI to copy the rendered bitmap onto the display device, step 150.

Figure 11B:
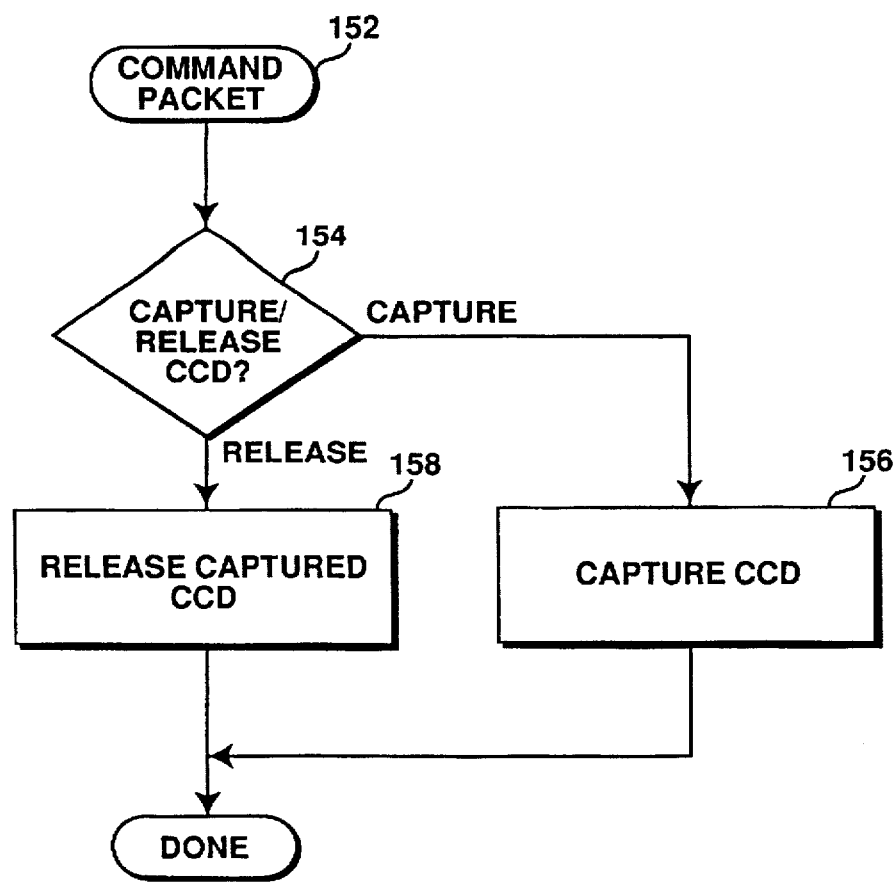

As shown in FIG. 11b, in response to the receipt of a command packet, AS' client services 138 determine if the command is to capture or to release the cursor control device, step 154. Upon making the determination, AS' client services 138 then perform the command accordingly, step 156 or 158. As will be appreciated by those skilled in the art, capturing and releasing of a cursor control device is performed in an operating system dependent operation.

Figure 11C:
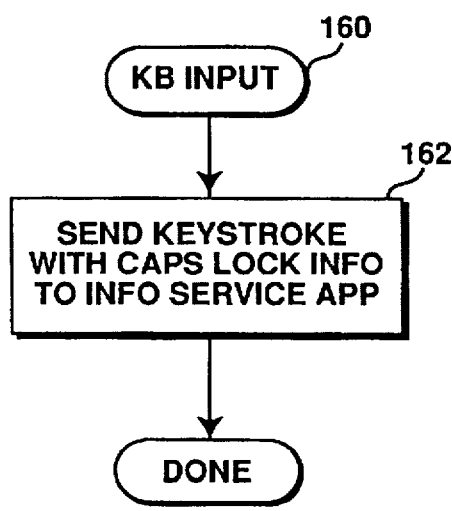

As shown in FIG. 11c, in response to keyboard inputs that are relevant to the "projected" or "shared" windowed display of the on-line/information service manager/applications 316 or 318, AS' client services 138 forward the keystrokes to on-line/information services manager/applications 316 or 318, step 162.

Figure 11D:
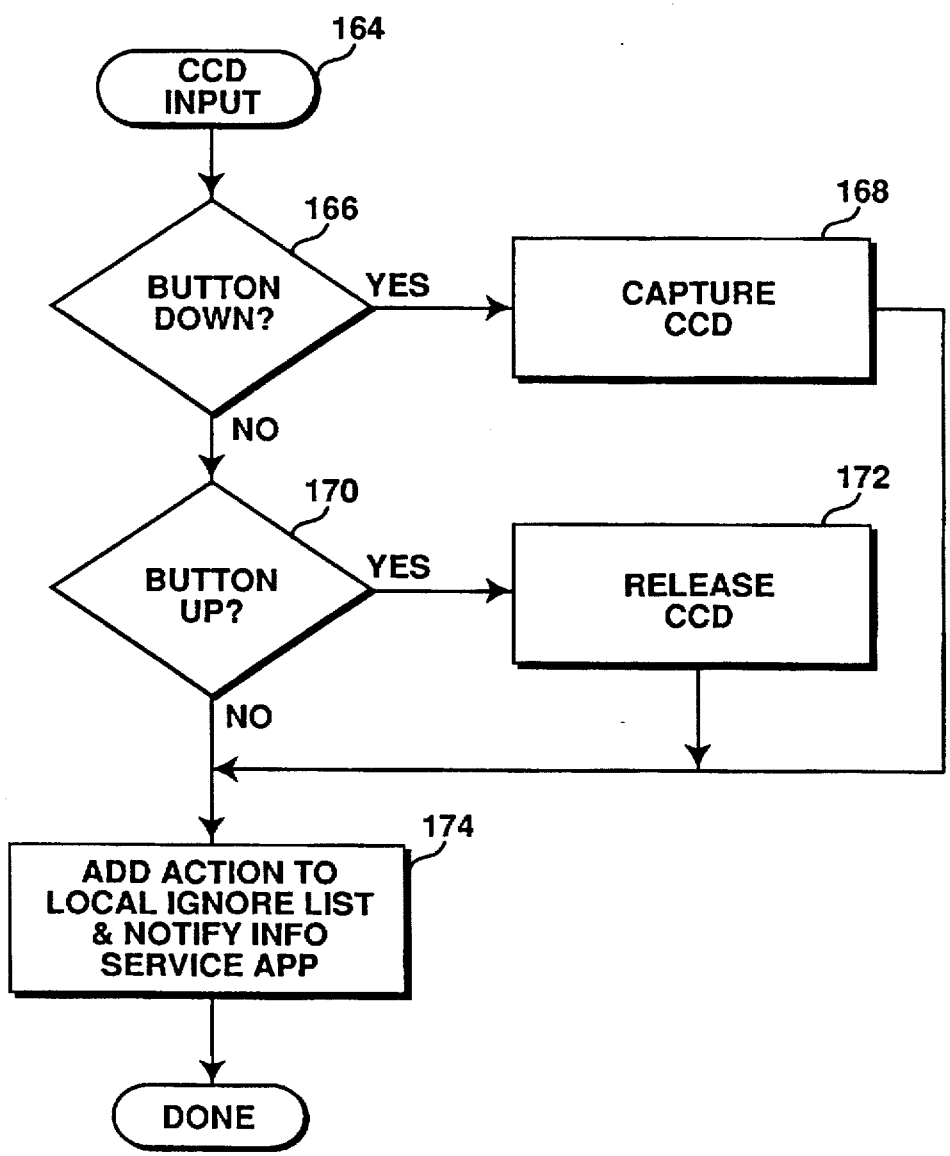

As shown in FIG. 11d, in response to a cursor control input, AS' client services 138 first determine if the cursor control input is a button down input, step 166. If the input is determined to be a button down input, AS' client services 138 capture the cursor control device, step 168. If the input is determined not to be a button down input, AS' client services 138 further determine if the input is a button up input, step 170. If the input is determined to a button up input, AS' client services 138 release the cursor control device, step 168, otherwise AS' client services 138 add the input action to the local ignore list and notify on-line/information manager/applications 316 or 318.

The above described streamlined application sharing services is a streamlined version of application sharing services disclosed in copending U.S. patent application, Ser. No. 08/261,740, filed on Jun. 17, 1994, entitled Apparatus And Method For Application Sharing In A Graphical User Interface, which is now abandoned in favor of File-Wrapper Continuation Application, filed on Apr. 12, 1996, same title. The reason streamlined services may be employed is because of the absence of the "competing" cursor on the on-line/information server 22. For a more detailed description of full application sharing services, see the above identified co-pending U.S. patent application. As will be appreciated by those skilled in the art, application sharing services, in particular, the streamlined version, require relatively small amount of code to implement. Couple that with the generic nature of their functions, it is expected that application sharing services or their equivalent will be an integral part of future operating systems. At such time, the friendliness, efficiency and cost effectiveness of the present invention would come extremely close to the employment of the telephone for delivering information services.

Thus, a method and apparatus for accessing/delivering on-line/information services has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An on-line/information service system comprising:
   (a) at least one on-line/information server providing a plurality of individualized on-line/information service delivery environments for serving up to a corresponding plurality of remote computer callers, one service delivery environment per computer caller, each of the plurality of individualized on-line/information service delivery environments having a plurality of selectively executable on-line/information service applications and application sharing host services for sharing executing ones of the on-line/information service applications with corresponding remote computers;
      wherein the remote computers are equipped with complimentary application sharing client services;
      wherein each of the plurality of individualized on-line/ information service delivery environments are created by replicating an operating system and the application to accommodate said plurality of remote computer callers;
      wherein said replicated operating system and application are executed on said at least one on-line/ information server location; and
   (b) a caller management server for managing multiple concurrent calls from the remote computer callers, assigning and connecting the calls to corresponding ones of the individualized on-line/information service delivery environments for provision of on-line/ information services by selected ones of the on-line/ information service applications.

2. The system as claimed in claim 1, wherein
   on-line/information services are provided on a callee service provider basis; and
   the caller management server comprises a plurality of application profiles for a plurality of callee service providers, which are selectively provided to the service delivery environments, when assigning and connecting remote computer callers to the service delivery environments, responsive to the calls of the remote computer callers.

3. The system as claimed in claim 1, wherein
   on-line/information services are provided on a caller basis; and
   the caller management server comprises a plurality of application profiles for the remote computer callers, which are selectively provided to the service delivery environments, when assigning and connecting the remote computer callers to the service delivery environments, responsive to the calls of the remote computer callers.

4. The system as claimed in claim 1, wherein the at least one on-line/information server comprises at least one massively parallel multi-processor computer system having N application supporting processors for executing N corresponding copies of like operating systems employed by the remote computers.

5. The system as claimed in claim 1, wherein the caller management server comprises a multi-processor server executing a network operating system compatible with operating systems of the remote computers.

6. The system as claimed in claim 1, wherein the system further includes a local private telephone exchange for switching multiple concurrent calls from the remote computer callers, and routing the calls to the call management server.

7. In an on-line/information service system, a method for delivering on-line/information services to a plurality of remote computer callers, the method comprising the steps of:

(a) assigning and connecting each of the remote computer callers to an individualized on-line/information service delivery environment, wherein each individualized on-line/information service delivery environment includes its own copy of operating system and applications executing on the on-line/information service system;

(b) providing an application profile for each of the remote computer callers to the corresponding assigned/connected on-line/information service delivery environments;

(c) application sharing service selection menus with each of the remote computers by the corresponding individualized on-line/information service delivery environments, responsive to the application profile provided, each of the on-line/information service delivery environments and the remote computers being equipped with complimentary application sharing host and client services respectively, wherein the applications are executed in the individualized on-line/information service delivery environments only;

(d) receiving input from the computer callers interacting with the corresponding service selection menus to select on-line/information services; and (e) application sharing on-line/information service applications with each of the remote computers by the corresponding individualized on-line/information service delivery environments, in response to the remote computer callers' interaction with the corresponding service selection menus.

8. The method as set forth in claim 7, wherein the application profile is provided in step (c) on a callee service provider basis.

9. The method as set forth in claim 7, wherein the application profile is provided in step (c) on a caller basis.

10. The method as set forth in claim 9, wherein step (a) further comprises validating the remote computer caller's eligibility for service.

11. The method as set forth in claim 7, wherein step (d) further comprises routing the remote computer caller's call to another on-line/information service system.

12. An on-line/information server comprising a plurality of parallel processors including N application support processors for providing N individualized on-line/information service delivery environments for servicing N remote computer callers, each of the N individualized on-line/information service delivery environments having a plurality of selectively executable on-line/information service applications, and application sharing host services for remotely sharing executing ones of the plurality of on-line/information service applications with corresponding remote computer callers equipped with complementary application sharing client services wherein the remote computers are equipped with complimentary application sharing client services;

wherein each of the plurality of individualized on-line/information service delivery environments are created by replicating the operating system and application to accommodate said plurality of remote computer callers; and wherein said replicated operating system and application are executed on said server location.

* * * * *